United States Patent Office.

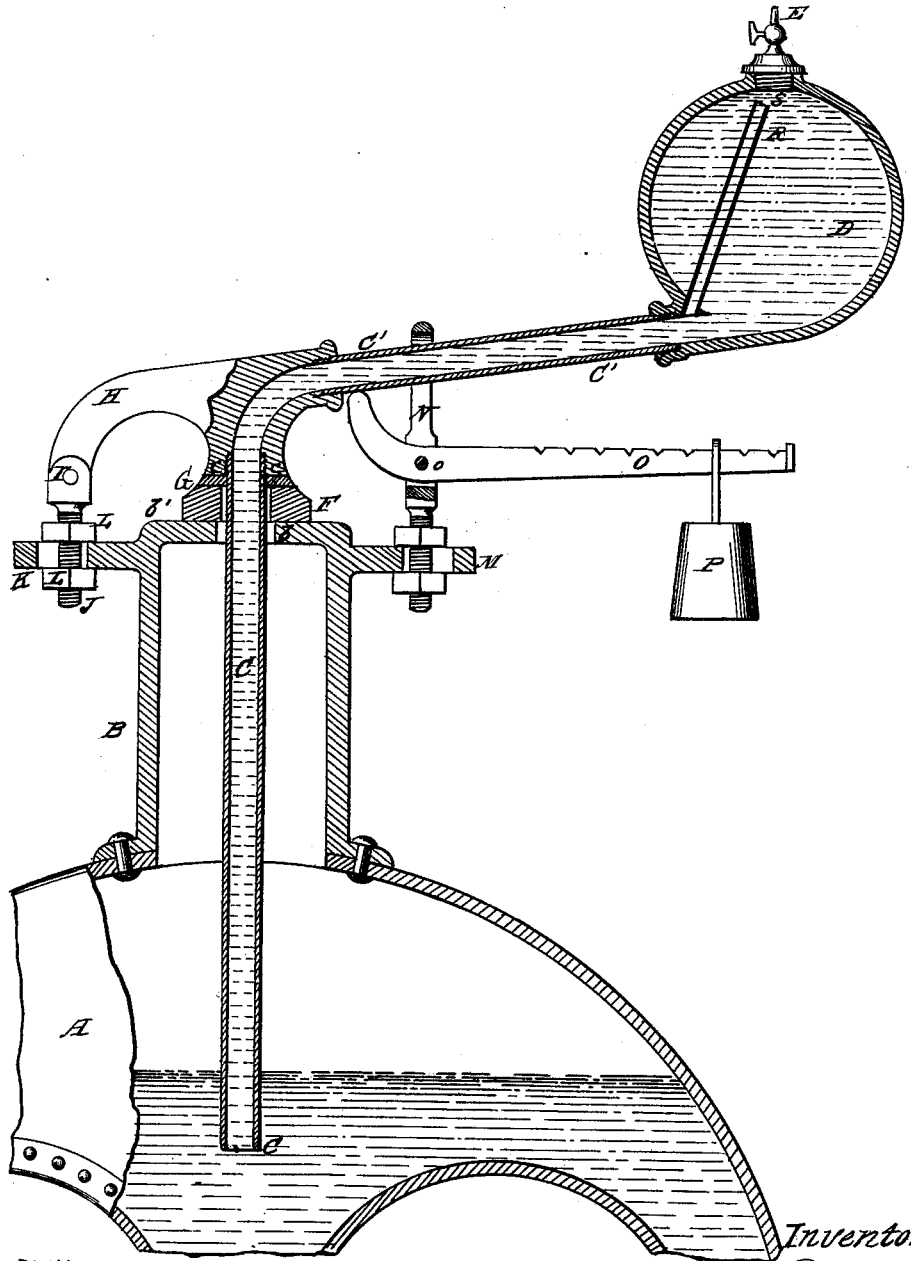

CHARLES BURLEY, OF CINCINNATI, OHIO.

Letters Patent No. 91,413, dated June 15, 1869.

---

IMPROVEMENT IN SAFETY-VALVES.

---

The Schedule referred to in these Letters Patent and making part of the same.

---

*To whom it may concern:*

Be it known that I, CHARLES BURLEY, of Cincinnati, Hamilton county, Ohio, have invented a new and useful Combined Safety-Valve and Low-Water Alarm; and I hereby declare the following to be a full, clear, and exact description thereof, reference being had to the accompanying drawings, making part of this specification.

This device, like that patented to me, December 17, 1867, is an attachment to a steam-boiler, for the purpose of giving warning, whether of excessive pressure, or of a deficiency of water in the boiler, and consists of a tube or hollow stem, which, entering the crown or upper part of the boiler, extends downward to within a few inches of the flues, or to that point below which it would be unsafe to have the water fall, said tube extending in the form of a lever above the boiler, and terminating in a hollow globe, or vessel, weighted with water from the boiler, which always fills it, so long as the lower extremity of the tube is immersed, the said globe and stem being balanced by a properly-weighted bar, and the whole so adjusted that the moment the desired maximum pressure is exceeded, the safety-valve rises.

Should the water fall below the bottom of the tube, the vessel is relieved of its contents, and being elevated by the conjoined influence of the steam and the balancing-weight, permits the steam to escape in such volumes as to give suitable warning both to eye and ear.

In the operation of the apparatus, an excess of pressure is indicated by rapid and intermittent discharges of steam; and depletion of water, by a voluminous and continuous discharge.

Practical tests of my said patented improvement, show that it is very important that the external portion of the pipe or stem, should be sufficiently inclined from the horizontal, to readily part with its contained water, the instant that steam enters it, so as to insure prompt and certain action, and to maintain such a circulation as best to avoid freezing in winter, which a horizontal pipe is subject to.

It is also desirable that the valve should drop squarely and evenly on its seat, independently of the changes of angle of the stem.

It is further desirable that such valve, with its appurtenances, should be capable of being, in some cases, placed out of control of irresponsible persons.

My invention consists in—

First, giving such declination to the globe-stem, toward its point of attachment, as to render it self-discharging.

Second, providing a steam-vent, or tube, leading from the upper end of the stem to near the top of the globe, to facilitate the passage of steam into the latter directly from the stem.

Third, the provision of a loose, self-adjusting valve, in combination with a yielding gasket, to prevent leakage.

Fourth, a mode of counterbalancing my hollow valve, which enables the entire mechanism to be enclosed within a locked case.

The subject of my invention is represented in the accompanying vertical section of the valve, and its accessories.

A represents a portion of a boiler.

B, its dome.

C is my tube-stem or pipe, which depends through the orifice $b$, of the dome, to a little below the water-level.

The portion C' of this tube, above the dome, slopes obliquely upward, and terminates in a hollow vessel, D, of the represented globular or other suitable form, having upon its upper side a small snifting-cock, E.

The external margin of the orifice $b$ is ground level, to form a seat, $b'$, for an annular valve, F, which fits loosely around the stem, and is held squarely down upon the seat by a collar, $c$, around the stem.

A gasket, G, between the collar and valve, serves the double purpose of securing an equal pressure of the collar, and preventing leakage.

Projecting from the stem in an opposite direction to that of the bend C', is an ear, H, perforated in the plane of the valve-seat to receive a pivot-bolt, I, by which the stem is hinged to a screw-shanked crotch, J, which is attached to, and both vertically and horizontally adjustable on a lug, K, which projects from the outside of the dome.

L are nuts, which hold the said crotch to its adjustment.

Projecting from the same side of the dome as the globe, is a lug, M, to which a screw-shanked yoke, N, has similar adjustable attachment to that of the crotch J. This yoke encloses the bend C', and restricts its upward vibration, and has an orifice for the reception of a bolt, or fulcrum-pin, $o$, of a bent lever, O, whose short arm is caused to press upward against the bend C', by a weight, P, that is adjustable upon the long arm of said lever, so that, by shifting the weight toward or from the fulcrum, the apparatus is adjusted to discharge steam at any selected pressure.

Extending obliquely upward from, and communicating with the upper interior of the bend C', where it joins the globe, is a tube, R, which affords a direct communication between the said upper part of the bend and that of the globe, so as to permit steam to enter the latter freely from the stem, without having to traverse the water in the globe.

The globe D, if of cast-metal, may have a plug, S, which, being removed, enables the tube R to be screwed in from the top, or, if of wrought-metal, may have the tube inserted from below, and brazed, or riveted, at the point of attachment.

Except in the particulars already recited, the apparatus is substantially the same in its operation, with that of my patent aforesaid; but differs, in its more prompt and certain action, in consequence of the ready entrance of steam to the globe, along the acclined bend C', and the tube R, and in the fact that the loose valve F, rests more squarely upon its seat than one rigidly attached to the stem would do.

Moreover, the provision of the bent lever O, on the globe-side of the stem, brings the entire external portion of the apparatus within more compact dimensions, and facilitates the encasing of the same under lock and key.

The snifting-cock is, of course, left open at starting, until the discharge of water from it indicates the filling of the globe.

I have described the preferred form of my improvement, but do not propose to restrict myself to the precise form shown.

For example, the stem C, may, in some cases, depend more or less obliquely into the boiler, and the lever may be a rigid projection from the stem on the opposite side of the globe, as in my aforesaid patent.

Again, the vessel D may have a cylindrical, or other form, and the apparatus may be applied directly to the upper part of a boiler, without the intervention of a dome.

I may also use a spring in place of a weighted counterbalance. The object of the spring or weight is to counterbalance the gravity of the metal in the stem, and its appurtenances, so as to insure their elevation when depleted of water, and its adjustment is to enable the valve to open at any desired maximum pressure of steam, even when the pipes are full.

I claim herein as new, and of my invention—

1. The arrangement, in combination with the vessel D and pipe C, of the connecting-pipe C', inclined while in a state of rest, as shown.

2. The tube R, enclosed within the vessel D, so as to leave the pipes C C' free for the circulation of steam and water, substantially as set forth.

3. The combination of the loose valve F, gasket G, and collar c, with the pipes C C' and vessel D, substantially as shown and explained.

4. The arrangement of the counterbalance O P, to act in connection with the pipe C' and vessel D, substantially as described.

In testimony of which invention, I hereunto set my hand.

CHARLES BURLEY.

Witnesses:
GEO. H. KNIGHT,
JAMES H. LAYMAN.